United States Patent
Bageshwar et al.

(10) Patent No.: US 10,605,607 B2
(45) Date of Patent: Mar. 31, 2020

(54) TWO STEP PRUNING IN A PHD FILTER

(71) Applicant: Honeywell International Inc., Morristown, NJ (US)

(72) Inventors: Vibhor L. Bageshwar, Minneapolis, MN (US); Michael Ray Elgersma, Plymouth, MN (US); Eric A. Euteneuer, St. Anthony Village, MN (US)

(73) Assignee: Honeywell International Inc., Morris Plains, NJ (US)

( * ) Notice: Subject to any disclaimer, the term of this patent is extended or adjusted under 35 U.S.C. 154(b) by 906 days.

(21) Appl. No.: 14/448,819

(22) Filed: Jul. 31, 2014

(65) Prior Publication Data

US 2016/0033282 A1    Feb. 4, 2016

(51) Int. Cl.
*G01C 21/20* (2006.01)
*G01S 13/93* (2006.01)
(Continued)

(52) U.S. Cl.
CPC ............ *G01C 21/20* (2013.01); *G01B 21/16* (2013.01); *G01S 13/726* (2013.01); *G01S 13/86* (2013.01);
(Continued)

(58) Field of Classification Search
CPC ..................................................... G01C 21/20
(Continued)

(56) References Cited

U.S. PATENT DOCUMENTS

| 4,816,833 A | 3/1989 | Ferguson et al. |
| 5,390,133 A | 2/1995 | Sohie |

(Continued)

FOREIGN PATENT DOCUMENTS

| CN | 101894381 A | 11/2010 |
| CN | 102064783 A | 5/2011 |

(Continued)

OTHER PUBLICATIONS

M. Pace and et al, "Comparison of Implementations of Gaussian Mixture PHD Filters", Jul. 26-29, 2010, Information Fusion (Fusion), 2010 13th Conference.*

(Continued)

*Primary Examiner* — Alexander Satanovsky
*Assistant Examiner* — Douglas Kay
(74) *Attorney, Agent, or Firm* — Fogg and Powers LLC

(57) ABSTRACT

In one embodiment, a method of tracking multiple objects with a probabilistic hypothesis density filter is provided. The method includes providing a plurality of intensities. The plurality of intensities are pruned based on their respective weight to remove lower weighted intensities and produce a first set of intensities. Intensities in the first set of intensities that are identified as corresponding to the same object are then merged to produce a second set of intensities. The second set of intensities is then pruned again to produce a final set of intensities, wherein pruning the second set of intensities includes in the final set of intensities, up to a threshold number of intensities having the largest weights in the second set of intensities and excludes from the final set of intensities any remaining intensities in the second set of intensities.

18 Claims, 3 Drawing Sheets

(51) Int. Cl.
*G01S 13/72* (2006.01)
*G01S 13/86* (2006.01)
*G01B 21/16* (2006.01)

(52) U.S. Cl.
CPC .......... *G01S 13/865* (2013.01); *G01S 13/867* (2013.01); *G01S 13/9303* (2013.01)

(58) Field of Classification Search
USPC ...................................................... 702/150
See application file for complete search history.

(56) References Cited

U.S. PATENT DOCUMENTS

| | | | |
|---|---|---|---|
| 5,414,643 | A | 5/1995 | Blackman et al. |
| 5,767,793 | A * | 6/1998 | Agravante .............. G01S 7/032 180/167 |
| 5,798,942 | A | 8/1998 | Danchick et al. |
| 6,295,367 | B1 * | 9/2001 | Crabtree ............... G01S 3/7865 382/103 |
| 6,806,828 | B1 | 10/2004 | Sparrow et al. |
| 6,967,616 | B2 | 11/2005 | Etnyre |
| 7,218,270 | B1 | 5/2007 | Tamburino |
| 7,256,729 | B2 | 8/2007 | Bummerstede |
| 7,626,535 | B2 | 12/2009 | Ding et al. |
| 7,782,256 | B2 * | 8/2010 | Smith ....................... G01S 5/06 342/453 |
| 7,864,096 | B2 | 1/2011 | Stayton et al. |
| 7,965,867 | B2 | 6/2011 | Lanz |
| 8,264,379 | B2 | 9/2012 | Whitlow et al. |
| 8,378,881 | B2 | 2/2013 | LeMire et al. |
| 8,400,619 | B1 | 3/2013 | Bachrach et al. |
| 8,515,881 | B2 | 8/2013 | Schwoegler et al. |
| 8,731,829 | B2 | 5/2014 | Moriguchi et al. |
| 8,886,394 | B2 | 11/2014 | Noonan |
| 9,851,437 | B2 | 12/2017 | Bageshwar et al. |
| 10,078,903 | B2 | 9/2018 | Maltese et al. |
| 10,309,784 | B2 | 6/2019 | Bageshwar et al. |
| 2003/0042303 | A1 | 3/2003 | Tsikos et al. |
| 2003/0093187 | A1 | 5/2003 | Walker |
| 2004/0027274 | A1 | 2/2004 | Driessen et al. |
| 2004/0156467 | A1 | 8/2004 | Freifeld |
| 2004/0189521 | A1 | 9/2004 | Smith et al. |
| 2006/0008119 | A1 | 1/2006 | Chang et al. |
| 2008/0031492 | A1 | 2/2008 | Lanz |
| 2008/0111730 | A1 | 5/2008 | Ding et al. |
| 2008/0255911 | A1 | 10/2008 | Khosla |
| 2009/0212994 | A1 | 8/2009 | Hazma et al. |
| 2010/0231418 | A1 | 9/2010 | Whitlow et al. |
| 2012/0206300 | A1 | 8/2012 | Allam et al. |
| 2012/0221273 | A1 | 8/2012 | Furukawa |
| 2012/0233098 | A1 | 9/2012 | Schwoegler et al. |
| 2012/0277948 | A1 | 11/2012 | Noonan |
| 2013/0006577 | A1 | 1/2013 | Mathews et al. |
| 2013/0054142 | A1 | 2/2013 | Moriguchi et al. |
| 2013/0085661 | A1 | 4/2013 | Chan et al. |
| 2013/0229298 | A1 | 9/2013 | Eckstein et al. |
| 2014/0055460 | A1 | 2/2014 | Furukawa |
| 2015/0055821 | A1 * | 2/2015 | Fotland ................. G06K 9/3241 382/103 |
| 2015/0070347 | A1 | 3/2015 | Hofmann et al. |
| 2015/0308851 | A1 | 10/2015 | Morikawa et al. |
| 2016/0033281 | A1 | 2/2016 | Bageshwar et al. |
| 2016/0162738 | A1 * | 6/2016 | Miyano ................... G06T 7/277 348/143 |
| 2016/0350938 | A1 * | 12/2016 | Maltese .................. G06T 7/208 |

FOREIGN PATENT DOCUMENTS

| | | |
|---|---|---|
| CN | 103310115 A | 9/2013 |
| CN | 103345577 | 10/2013 |
| CN | 103390262 A | 11/2013 |
| CN | 103679753 A | 3/2014 |
| CN | 103729637 A | 4/2014 |
| CN | 103902819 A | 7/2014 |
| EP | 1533628 | 5/2005 |
| EP | 2228626 A2 | 9/2010 |
| WO | 2014011288 | 1/2014 |

OTHER PUBLICATIONS

D. Clark and et al, "Convergence Analysis of the Gaussian Mixture PHD Filter", Mar. 19, 2007, IEEE Transactions on Signal Processing ( vol. 55, Issue: 4, Apr. 2007 ).*

D. E. Clark "Multiple Target Tracking with the Probability Hypothesis Density Filter", Oct. 2006, Ph.D. Thesis, Dept. of EECE, Heriot-Watt University.*

Wang B and et al, "Outlier Detection over Sliding Windows for Probabilistic Data Streams", of Computer Science and Technology 25(3): 389{400 May 2010.*

European Patent Office, "Extended European Search Report from EP Application No. 15177585.5 dated Dec. 21, 2015", from Foreign Counterpart of U.S. Appl. No. 14/448,819, Dec. 21, 2015, pp. 1-9, Published in: EP.

Asseo, "Integration of Active and Passive Track Files From Internetted Aircraft for Enhanced Situation Awareness", May 23, 1988, pp. 242-250.

Chen et al., "Multi-Sensor Data Integration for Autonomous Sense and Avoid", Mar. 29-31, 2011, pp. 1-14, Publisher: American Institute of Aeronautics and Astronautics, Published in: St. Louis, Missouri.

Fasano et al., "Multi-Sensor Data fusion: A Tool to Enable UAS Integration into Civil Airspace", "30th Digital Avionics Systems Conference", Oct. 16-20, 2011, pp. 1-28, Published in: Seattle, WA.

Jovanoska et al., "Multiple target tracking by a distributed UWB sensor network based on the PHD filter", "2012 15th International Conference on Information Fusion", Jul. 9-12, 2012, pp. 1095-1102, Publisher: IEEE, Published in: DE.

Mahler, "Multitarget Bayes Filtering via First-Order Multitarget Moments", "IEEE Transactions on Aerospace and Electronic Systems", Oct. 2003, pp. 1152-1178, vol. 39, No. 4, Publisher: IEEE.

Panta et al., "Data Association and Track Management for the Gaussian Mixture Probability Hypothesis Density Filter", "IEEE Transactions on Aerospace and Electronics Systems", Jul. 2009, pp. 1003-1016, vol. 45, No. 3, Publisher: IEEE.

Vo et al., "Tha Gaussian Mixture Probability Hypothesis Density Filter", "IEEE Transactions Signal Processing", Nov. 2006, pp. 4091-4104, vol. 54, No. 11, Publisher: IEEE.

European Patent Office, "Office Action for EP Patent Application No. 15177585.5", from Foreign Counterpart of U.S. Appl. No. 14/448,819, Jul. 27, 2016, pp. 1-5, Published in: EP.

Blasch et al., "Identifying Moving HRR Signatures with an ATR Belief Data Association Filter", Proceedings of SPIE, AeroSense 2000, Dated 2000, pp. 478-488, Published in: US.

U.S. Patent and Trademark Office, "Advisory Action for U.S. Appl. No. 14/448,808", dated Apr. 16, 2018, pp. 1-6, Published in: US.

U.S. Patent and Trademark Office, "Office Action for U.S. Appl. No. 14/448,803", dated Mar. 27, 2018, pp. 1-37, Published in: US.

Zou et al, "Radio Frequency Identification Enabled Wireless Sending for Intelligent Food Logistics", Philosophical Transactions of the Royal Society, Downloaded from http://rsta.royalsocietypublishing.org/ on Feb. 17, 2017, pp. 1-17, Publisher: Royal Society Publishing.

United States Patent and Trademark Office, "Advisory Action for U.S. Appl. No. 14/448,803", dated Jan. 31, 2018, pp. 1-5, Published in: US.

United States Patent and Trademark Office, "Final Office Action for U.S. Appl. No. 14/448,808", dated Jan. 5, 2018, pp. 1-16, Published in: US.

European Patent Office, "Extended European Search Report from EP Application No. 15177590.5 dated Dec. 22, 2015", from foreign counterpart of U.S. Appl. No. 14/448,803, Dec. 22, 2015, pp. 1-8, Published in: EP.

United States Patent and Trademark Office, "Final Office Action", From U.S. Appl. No. 14/448,803, dated Oct. 20, 2017, pp. 1-28, Published in: US.

(56) References Cited

OTHER PUBLICATIONS

United States Patent and Trademark Office, "Office Action", From U.S. Appl. No. 14/448,803, dated Mar. 6, 2017, pp. 1-33, Published in: US.
United States Patent and Trademark Office, "Office Action", From U.S. Appl. No. 14/448,803, dated Apr. 6, 2017, pp. 1-33, Published in: US.
European Patent Office, "Extended European Search Report from EP Application No. 15177589.7 dated Dec. 17, 2015", from Foreign Counterpart of U.S. Appl. No. 14/448,808, Dec. 17, 2015, pp. 1-10, Published in: EP.
United States Patent and Trademark Office, "Office Action", From U.S. Appl. No. 14/448,808, dated Jul. 3, 2017, pp. 1-22, Published in: US.
European Patent Office, "Extended European Search Report from EP Application No. 15176942.9 dated Jan. 4, 2016", from Foreign Counterpart of U.S. Appl. No. 14/448,813, Jan. 4, 2016, pp. 1-8, Published in: EP.
United States Patent and Trademark Office, "Advisory Action", From U.S. Appl. No. 14/448,813, dated Mar. 9, 2017, pp. 1-4, Published in: US.
United States Patent and Trademark Office, "Final Office Action", From U.S. Appl. No. 14/448,813, dated Dec. 21, 2016, pp. 1-11, Published in: US.
United States Patent and Trademark Office, "Notice of Allowance", From U.S. Appl. No. 14/448,813, dated Aug. 22, 2017, pp. 1-8, Published in: US.
United States Patent and Trademark Office, "Office Action", From U.S. Appl. No. 14/448,813, dated Aug. 19, 2016, pp. 1-17, Published in: US.
United States Patent and Trademark Office, "Office Action", From U.S. Appl. No. 14/448,813, dated Apr. 15, 2017, pp. 1-10, Published in: US.
Danu et al., "Assignment-Based Particle Labeling for PHD Particle Filter", Signal and Data Processing of Small Targets, 2009, pp. 1-12, Publisher Proceedings of SPIE vol. 7445.
Daniel Edward Clark, "Multiple Target Tracking With the Probability Hypothesis Density Filter", Oct. 2006, pp. 1-211.
Panta et al., "Novel Data Association Schemes for the Probability Hypothesis Density Filter", IEEE Transactions on Aerospace and Electronics Systems, Apr. 1, 2007, pp. 556-570, vol. 43, No. 2.
Quang M Lam, "Probability Hypothesis Density Filter Based Design Concept: A Survey for Space Traffic Modeling and Control", Jun. 21, 2012.
U.S. Patent and Trademark Office, "Office Action for U.S. Appl. No. 14/448,808", dated May 17, 2018, pp. 1-15, Published in: US.
State of Israel Ministry of Justice, Notice of Defects in Patent Application from IL Application No. 240076, dated May 18, 2018, from Foreign Counterpart of U.S. Appl. No. 14/448,808, May 18, 2018, pp. 1-6, Published in: IL.
State of Israel Ministry of Justice, Notice of Defects in Patent Application from IL Application No. 240077, dated May 28, 2018, from Foreign Counterpart of U.S. Appl. No. 14/448,803, May 28, 2018, pp. 1-9, Published in: IL.
European Patent Office, "Communication pursuant to Article 94(3) from EP Application No. 15177589.7 dated Apr. 1, 2019", from Foreign Counterpart to U.S. Appl. No. 14/448,808, pp. 1-6, Published: EP.
Hebing, "Probability Hypothesis Density Filter Algorithm and its Applications in Multi-Targets Tracking", A Dissertation for the Degree of Doctor of Engineering, Apr. 2010, pp. 1-117, Harbin Engineering University.
Israel Patent Office Ministry of Justice, "Office Action from IL Application No. 093110021.000 dated Apr. 15, 2019", from Foreign Counterpart to U.S. Appl. 14/448,803, pp. 1-3, Published: IL.
Israel Patent Office Ministry of Justice, "Office Action from IL Patent Application No. 240074", from Foreign Counterpart of U.S. Appl. No. 14/448,819, Mar. 11, 2019, pp. 1-5, Published in: IL.
National Intellectual Property Administration, P.R. China, "First Office Action from CN Application No. 201510560799.4 dated Feb. 2, 2019", from Foreign Counterpart to U.S. Appl. No. 14/448,808, pp. 1-20, Published: CN.
U.S. Patent and Trademark Office, "Advisory Action", U.S. Appl. No. 14/448,803, dated Apr. 1, 2019, pp. 1-8, Published: US.
Xue-Bin et al., "The Gaussian Mixture Probability Hypothesis Density Filter and Its Application to Multi-Target Tracking", Chinese Journal of Computers, Feb. 2012, pp. 1-10, vol. 35, No. 2.
European Patent Office, "Communication Pursuant to Article 94(3) from EP Application No 15177590.5", Foreign Counterpart to U.S. Appl. 14/448,803, dated Oct. 15, 2018, pp. 1-4, Published in: EP.
Israel Patent Office Ministry of Justice, "Office Action", from Foreign Counterpart of U.S. Appl. No. 14/448,808, dated Sep. 2, 2017, pp. 1-2, Published in: IL.
Srael Patent Office Ministry of Justice, "Office Action", from Foreign Counterpart of U.S. Appl. No. 14/448,819, dated Oct. 31, 2018, pp. 1-5, Published in: IL.
N. N. Okello and et al. "TRACKER: TRACKER: a sensor fusion simulator for generalised tracking", 1999 Information, Decision and Control, Data and Information Fusion Symposium, Signal Processing and Communications Symposium (Year: 1999).
United States Patent and Trademark Office, "Final Office Action for U.S. Appl. No. 14/448,803", dated Dec. 14, 2018, pp. 1-44, Published in: US.
United States Patent and Trademark Office, "Notice of Allowance" from U.S. Appl. No. 14/448,808, dated Jan. 23, 2019, pp. 1-9, Published: US.
United States Patent and Trademark Office, "Final Office Action for U.S. Appl. No. 14/448,808", dated Nov. 1, 2018, pp. 1-13, Published in: US.
National Intellectual Property Administration, P.R. China, "First Office Action from CN Application No. 201510628780.9 dated Feb. 28, 2019", from Foreign Counterpart to U.S. Appl. No. 14/448,813, pp. 1-13, Published: CN.
Bo, "Research on the Technology for Multi-target Tracking Based on Random Finite Set", A Dissertation Submitted for the Degree of Master, 2013, pp. 1-124, South China University of Technology.
Clark et al., "Convergence Analysis of the Gaussian Mixture", IEEE Transactions on Signal Processing, Mar. 19, 2007, pp. 1204-1212, IEEE.
National Intellectual Property Administration, P.R. China, "First Office Action from CN Application No. 201510564395.2 dated Jul. 3, 2019", from Foreign Counterpart to U.S. Appl. No. 14/448,819, pp. 1-14, Published: CN.
Pace, "Comparison of Implementations of Gaussuan Mixture PHD Filters", 13th International Conference on Information Fusion, Jul. 2010, pp. 1-8, IEEE.
National Intellectual Property Administration, P.R. China, "First Office Action from CN Application No. 201510594941.7 dated Mar. 27, 2019", from Foreign Counterpart to U.S. Appl. No. 14/448,803, pp. 1-14, Published: CN.
National Intellectual Property Office, P.R. China, "Second Office Action from CN Application No. 201510628780.9 dated Jul. 11, 2019", from Foreign Counterpart to U.S. Appl. No. 14/448,813, pp. 1-8, Published: CN.
U.S. Patent and Trademark Office, "Office Action", U.S. Appl. No. 14/448,803, dated Jun. 26, 2019, pp. 1-47, Published: U.S.
National Intellectual Property Administration, P.R. China, "Notification to Grant Patent Right for Invention from CN Application No. 201510594941.7", from Foreign Counterpart to U.S. Appl. No. 14/448,803, dated Oct. 24, 2019, pp. 1-7, Published: CN.

\* cited by examiner

TWO STEP PRUNING IN A PHD FILTER

CROSS-REFERENCE TO RELATED APPLICATIONS

This application is related to the following co-pending United States patent applications, which are hereby incorporated herein by reference:

U.S. patent application Ser. No. 14/448,808, published as US2016/0033276 entitled "MERGING INTENSITIES IN A PHD FILTER BASED ON A SENSOR TRACK ID" filed on even date herewith;

U.S. patent application Ser. No. 14/448,813, published as US2016/0033633, entitled "ADJUSTING WEIGHT OF INTENSITY IN A PHD FILTER BASED ON SENSOR TRACK ID" filed on even date herewith; and U.S. patent application Ser. No. 14/448,803, published as US2016/0033281, entitled "UPDATING INTENSITIES IN A PHD FILTER BASED ON A SENSOR TRACK ID" filed on even date herewith.

BACKGROUND

The objective of see-and-avoid or sense-and-avoid (SAA) is to provide an unmanned aircraft system (UAS) with the capability to perform self-separation and collision avoidance against all air traffic, with or without active, transponder based collision avoidance systems. SAA requires the UAS to detect and track intruder aircraft in the operating vicinity of the ownship aircraft to identify guidance maneuvers required to perform self-separation and collision avoidance. The detect and track functions are key enablers for UAS SAA capability because the UAS cannot perform self-separation or collision avoidance maneuvers for undetected, untracked intruder aircraft. The detect function refers to using surveillance sensors to measure the position of intruder aircraft relative to the ownship UAS. The track function refers to fusing the surveillance sensor measurements together to estimate the trajectory statistics (also referred to herein as the track) of the intruder aircraft relative to the ownship UAS. The surveillance sensors provide measurements with corresponding measurement IDs that can be correlated across time or random across time.

The track function estimates the tracks of the intruder aircraft using a data association algorithm to assign measurements to a current track, a filter to fuse sensor measurements with the current estimates of the track statistics, and a trajectory manager that oversees the sensor fusion operation, initiates tracks, maintains tracks, and deletes tracks.

One tracking system uses random finite sets (RFS) to track multiple intruder aircraft (IA) for UAS SAA, with the RFS being an implementation of a multi-hypothesis testing (MHT) approach. RFS casts the multiple IA tracking problem into a set-valued state space where the statistics of the set-valued state vector and set-valued measurement vector are approximated using their first-order moments (also referred to herein as an intensity), and applied in a Bayesian filter framework to estimate the IA track statistics using Gaussian mixtures. The resulting filter is referred to as a probabilistic hypothesis density (PHD) filter. An intensity refers to a weight, a state mean vector, and a state covariance matrix of an element of the set-valued state space where this element corresponds to the statistics of a track.

SUMMARY

In one embodiment, a method of tracking multiple objects with a probabilistic hypothesis density filter is provided. The method includes providing a plurality of intensities, each intensity associated with a weight, a state mean vector, and a state covariance matrix of statistics of a track for a plurality of objects at a first time. The method also includes first pruning the plurality of intensities based on their respective weight to remove lower weighted intensities and produce a first set of intensities. Intensities in the first set of intensities that are identified as corresponding to the same object are merged to produce a second set of intensities. The method then includes second pruning the second set of intensities to produce a final set of intensities, wherein second pruning includes in the final set of intensities, up to a threshold number of intensities having the largest weights in the second set of intensities and excludes from the final set of intensities any remaining intensities in the second set of intensities.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

The subject matter described herein provides for a method of pruning intensities that are generated in a probabilistic hypothesis density (PHD) filter. The method includes two pruning steps with a merging step in between. The first pruning step prunes a plurality of intensities based on their weights irrespective of the number of intensities remaining after pruning After the first pruning step, the remaining intensities go through a merging step to combine appropriate intensities. Following the merging step, a second pruning step reduces the total number of intensities to below a threshold number if necessary.

Figure 1:
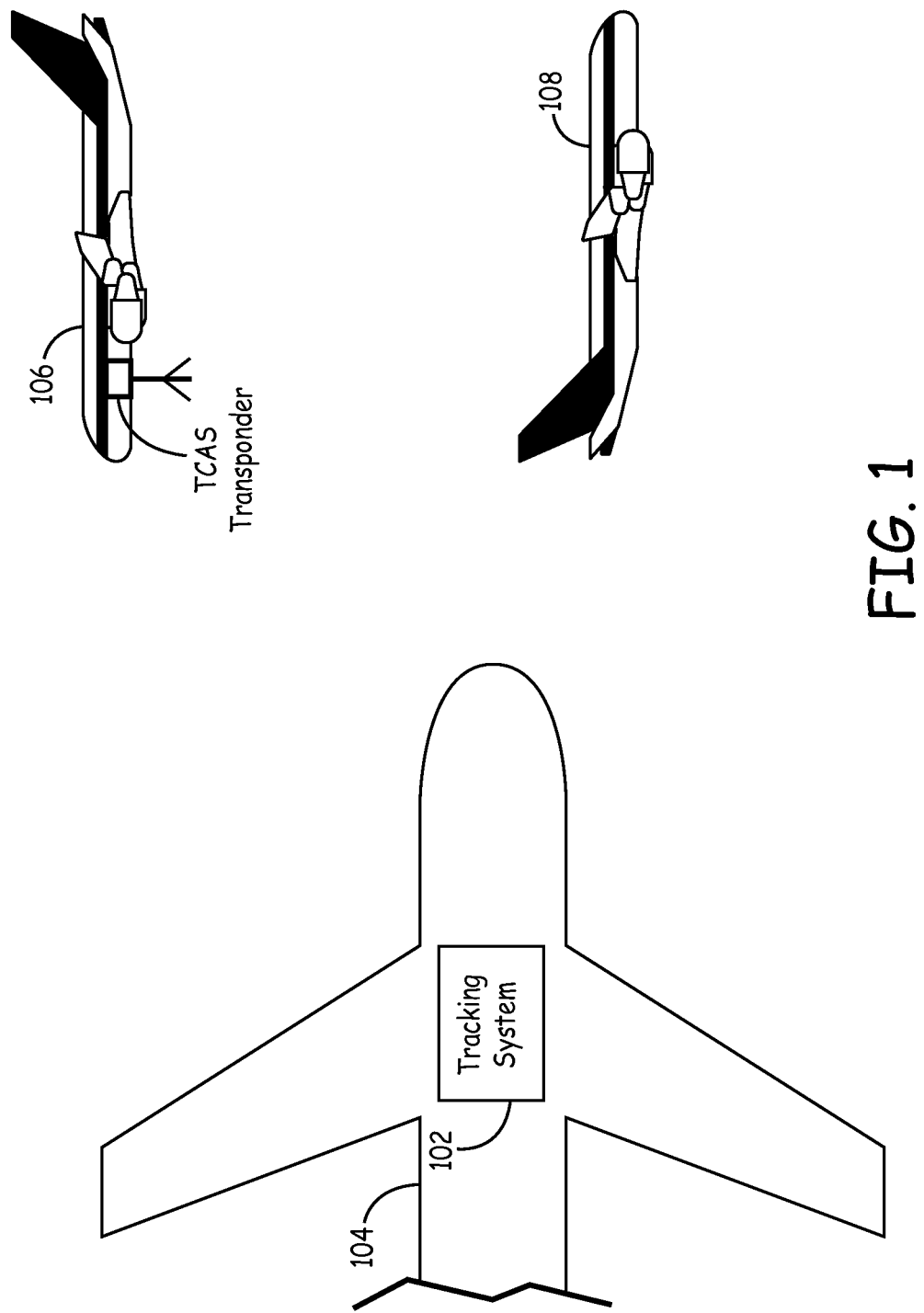
FIG. 1 is a block diagram of an example environment in which a PHD filter based tracking system may be used.

FIG. 1 is a block diagram of an example environment in which a PHD filter based tracking system 102 may be used. In the example shown herein, the tracking system 102 is installed within an aircraft 104, however, the tracking system 102 can be installed within any vehicle or can be a standalone system. The tracking system 102 is configured to detect and track other objects in the environment. In this example, the tracking system 102 is configured to detect objects in the air such as intruder aircraft (IA) 106, 108. In an example, the tracking system 102 is part of a sense-and-avoid (SAA) system and the aircraft 104 is an unmanned aircraft system (UAS).

Figure 2:
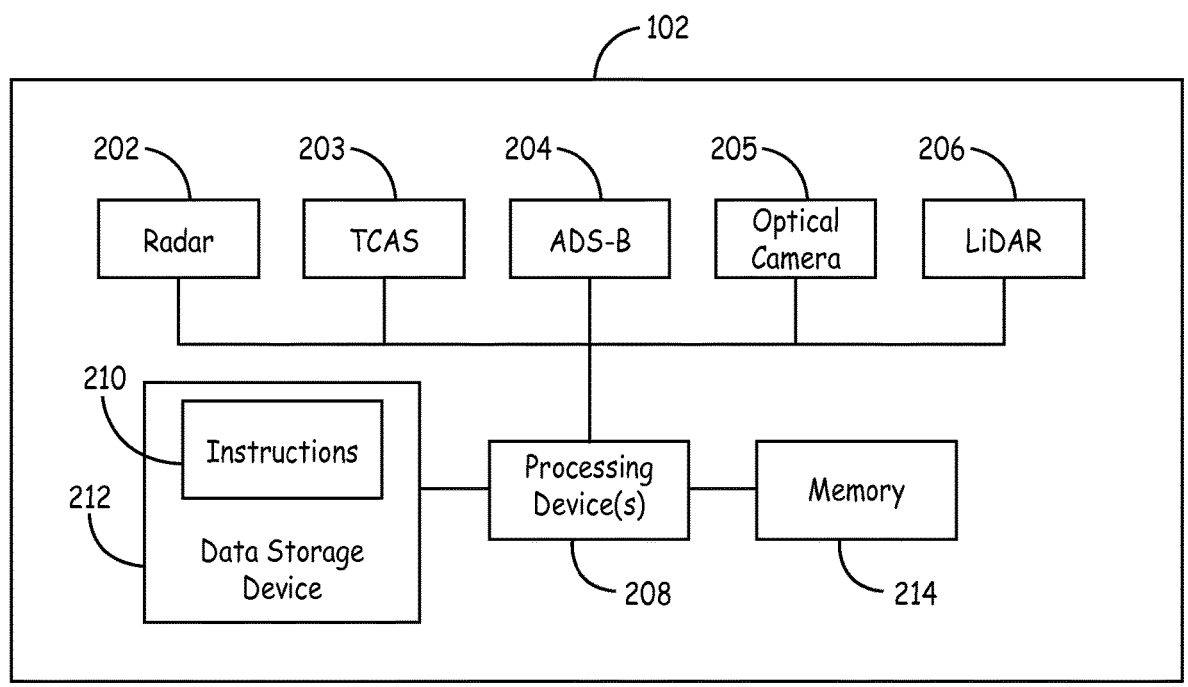
FIG. 2 is a block diagram of an example tracking system used in the environment of FIG. 1.

FIG. 2 is a block diagram of an example tracking system 102. The tracking system 102 includes a plurality of sensors 202-206 configured to detect objects in the environment around the sensors 202-206. The plurality of sensors 202-206 can include any suitable sensor such as a radar 202, TCAS sensor 203, ADS-B sensor 204, optical camera 205, and a LiDAR 206. Other sensors may be used as well. Additionally, any number of sensors including multiple of the same type of sensors may be used. The sensors 202-206 are coupled to one or more processing devices 208. The sensors 202-206 are configured to obtain measurements and send the measurements to the one or more processing devices 208.

The one or more processing devices 208 are configured to track a plurality of objects (such as intruder aircraft 106, 108) based on the measurements received from the sensors 202-206. To track the objects, the one or more processing devices 208 are configured to execute instructions 210 stored on one or more data storage devices 212 coupled to the one or more processing devices 208. The instructions 210, when executed by the one or more processing devices 208, cause the one or more processing devices 208 to implement the actions to track objects based on the measurements from the sensors 202-206. The one or more processing devices 208 can include a central processing unit (CPU), microcontroller, microprocessor, (e.g., a digital signal processor), field programmable gate array (FPGA), application specific integrated circuit (ASIC), or other processing device. In certain examples, the one or more data storage devices 212 include a non-volatile electronic hardware device for storing machine readable data and instructions. In an example, the one or more data storage devices 212 store information on any appropriate computer readable medium used for storage of computer readable instructions or data structures. The computer readable medium can be implemented as any available media that can be accessed by the one or more processing devices 208. Suitable computer readable media may include storage media such as magnetic or optical media. For example, storage media can include a conventional hard disk, Compact Disk-Read Only Memory (CD-ROM), solid state drive (SSD), other flash memory, Read Only Memory (ROM), and Electrically Erasable Programmable ROM (EEPROM). The one or more processing devices 208 are also coupled to memory 214 that is configured to store data and instructions during execution by the one or more processing devices 208. The memory 214 can include volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), and Static RAM (SRAM), etc.). In an example, the one or more processing devices 208 are configured to output information regarding the tracks of the objects to an output device such as a display device. In some examples, the one or more processing devices 208 provide the track information to a larger SAA system for controlling movement of an unmanned aircraft system.

Figure 3:
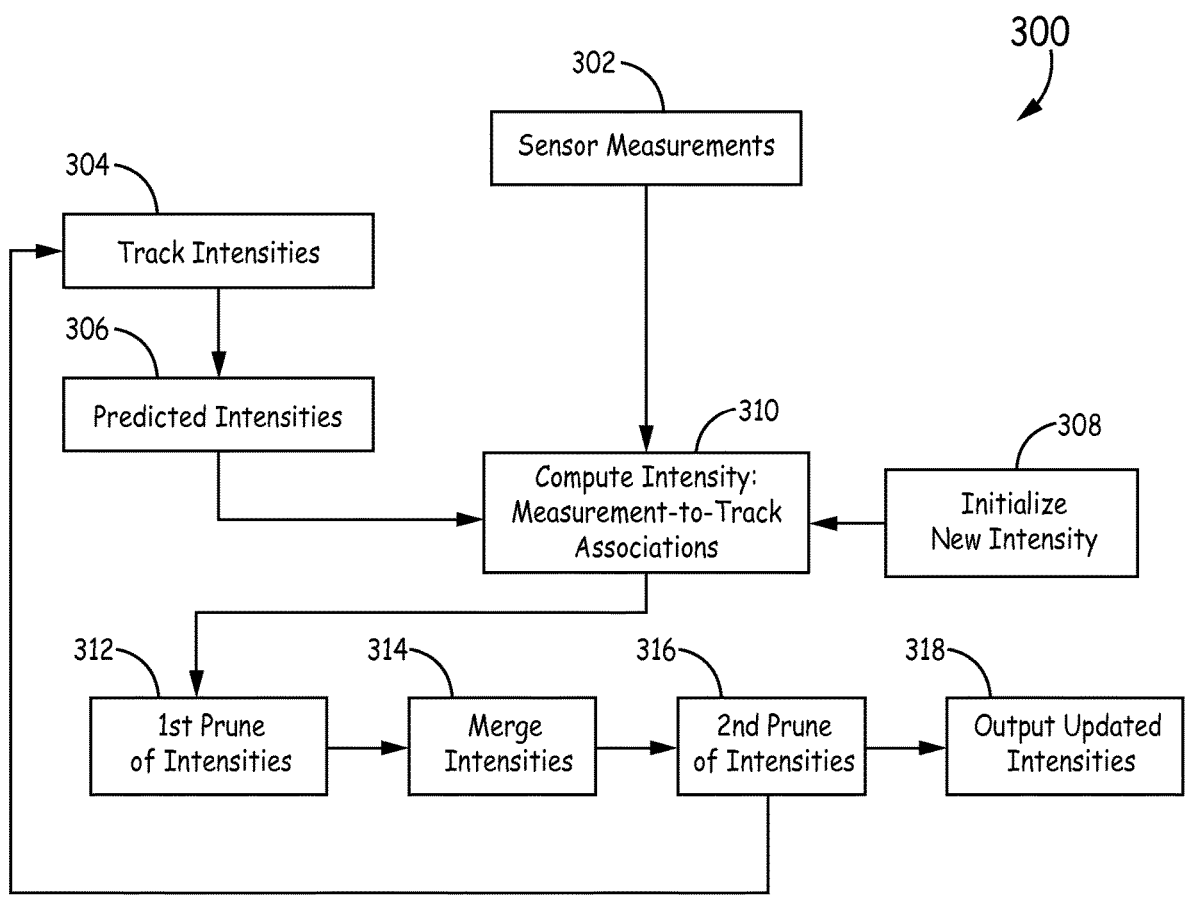
FIG. 3 is a flow diagram of an example method for tracking a plurality of objects with the tracking system of FIG. 2.

FIG. 3 is a flow diagram of an example method 300 for tracking a plurality of objects with the tracking system 102. The tracking system 102 implements a loop based on newly obtained measurements (block 302) from the sensors 202-206. The loop operates in real time to track a plurality of objects that are measured by the sensors 202-206. As discussed above, the loop implements a probabilistic hypothesis density (PHD) filter to update the intensities. The PHD filter loop attempts to maintain a single intensity for each object being tracked. In the case of a tracking system 102 for an aircraft 104, the PHD filter loop attempts to maintain a single intensity for each intruder aircraft 106, 108, and/or other airborne object within a field-of-view of a sensor 202-206. During a given loop, one or more intensities are maintained corresponding to the number of objects being tracked at that time. Each iteration through the loop updates each intensity being maintained to the next time step unless the particular intensity is deleted during pruning (i.e., no longer tracked).

As mentioned above, each loop of method 300 updates each intensity that is not deleted to the next time step. As used herein, time steps are referred to as $T_k$, $T_{k+1}$ for the time step which immediately follows time step $T_k$, $T_{k+2}$ for the time step which immediately follows time step $T_{k+1}$, etc. The length of time corresponding to a time step can be determined in any suitable manner, such as based on the frequency of measurements provided by one or more of the sensors 202-206. For a given loop of the method 300, the one or more measurements provided by the sensors 202-206 correspond to the time step at which the one or more intensities are being updated. In an example loop, therefore, the one or more intensities input into the loop (block 304) correspond to time step $T_k$ and the one or more measurements input into the loop (block 302) correspond to time step $T_{k+1}$. During this iteration of the loop, the one or more intensities are predicted to time step $T_{k+1}$ (block 306) and updated to time step $T_{k+1}$ using the one or more measurements that correspond to time step $T_{k+1}$.

In an example, one or more $T_k$ intensities (intensities corresponding to time step $T_k$) are provided (block 304) from the previous iteration of the loop. The one or more $T_k$ intensities are the one or more intensities that were output from the previous iteration of the loop. In examples where the tracking system 102 provides tracks of objects to an SAA system, the one or more $T_k$ intensities are output to the SAA system as the tracks for time step $T_k$. Each intensity progresses through multiple intermediate stages during updating by method 300. An intensity that has completed updating for a given time step and is output (e.g., to an SAA system) is referred to herein as a "track intensity". Accordingly, the one or more $T_k$ intensities input into a loop of method 300 are also referred to herein as one or more $T_k$ "track" intensities.

Each of the one or more $T_k$ track intensities is propagated forward in time by first generating a predicted intensity for time step $T_{k+1}$ (a $T_{k+1}$ predicted intensity) (block 306) for each of the one or more $T_k$ track intensities. These one or more $T_{k+1}$ predicted intensities can be computed in any suitable manner including in ways known to those skilled in the art. One or more new intensities can also be created for time step $T_{k+1}$ (block 308). These new intensities can be created in any suitable manner including in ways known to those skilled in the art.

Once the predicted intensities and any new intensities have been created, measurement-to-track associations can be computed (block 310) based on the predicted/new intensities and the one or more measurements from the sensors 202-206. Computing a measurement-to-track association results in generating a measurement-to-track intensity by updating a predicted or new intensity with one of the measurements such that the resulting measurement-to-track intensity is the predicted/new intensity adjusted to incorporate the (new) measurement. The process of generating any measurement-to-track intensities can be performed in any suitable manner including in a manner known to those skilled in the art.

The one or more predicted intensities, any new intensities, and any measurement-to-track intensities are then further processed by pruning and merging. Pruning includes analyzing the one or more predicted intensities, any new intensities, and any measurement-to-track intensities to determine whether to delete any of the intensities. Among other things, pruning attempts to delete intensities that are not tracking an actual object. Merging includes combining intensities that are determined to correspond to the same object with the objective of having a single intensity represent each object.

As mentioned above, pruning includes two steps with a merging step in between the two steps. The first pruning step (block 312) includes deleting one or more intensities based on a threshold weight. This pruning step attempts to remove intensities that do not correspond closely to an actual object. Notably, however, this first pruning step does not limit the total number of intensities that remain.

In conventional pruning processes, pruning is a single step that reduces the number of intensities to at or below a maximum limit. This maximum limit can be based on hardware and/or software limitations of the tracking system 102, or based on design limitations of a system to which the intensities are being output (e.g., limitations of the SAA system). In any case, conventional pruning reduces the number of intensities down to at or below this maximum limit in a single step. After reducing the number of intensities down to at or below this maximum limit, the intensities may be analyzed and merged as appropriate. Since merging takes place after the intensities are reduced to at or below the maximum limit, the actual number of intensities output in these conventional systems may be further reduced from the maximum limit due to the merging of two or more intensities.

In an example, the subject matter described herein, however, does not limit the total number of intensities until after any appropriate intensities are merged. Thus, more intensities can be maintained and analyzed to be merged, while still reducing the number of intensities to at or below the maximum limit.

Accordingly, the first pruning step deletes one or more intensities based on a threshold weight, but does not reduce the number of intensities based on the maximum limit. In an example, the threshold weight is the same for each intensity; that is, each intensity is compared to the same threshold weight. In another example, the threshold weight is set for each intensity; that is, each intensity can be compared to a different threshold weight. In such an example, the threshold weight for a given intensity can be selected in any suitable manner. For example, the threshold weight for a given intensity can be selected based on which one or more sensors 202-206 have measurements that correspond to that given intensity. Sensors that are more accurate and are more likely to correspond to a higher weight, can result in a higher threshold weight for an intensity if measurements from such sensors are incorporated into the intensity. More sensors having a measurement incorporated into an intensity can also result in a higher threshold weight since more measurements from different sensors incorporated into an intensity may result in a higher weight.

In any case, the first pruning step includes comparing each of a plurality of intensities (including the one or more predicted intensities, any new intensities, and any measurement-to-track intensities) to a threshold weight to determine whether to delete or maintain the respective intensity. If an intensity is below the threshold weight, the intensity is deleted (no longer maintained). If an intensity is above the threshold weight, the intensity is maintained and is analyzed for merger. The first pruning step removes lower weighted intensities to produce a first set of intensities from the plurality of intensities.

The first set of intensities is then analyzed to be merged (block 314). As mentioned above, merging includes combining any intensities that are determined to correspond to the same object. Any appropriate process can be used to merge the first set of intensities. Merging the first set of intensities produces a second set of intensities.

The second set of intensities then goes through the second pruning step (block 316) to reduce the number of intensities in the second set to at or below a maximum limit. If the number of intensities in the second set is at or below the maximum limit, then no intensities are deleted in the second pruning step. If, however, the number of intensities in the second set of intensities is greater than the maximum limit, then the second set of intensities is analyzed to determine which one or more intensities are to be deleted to reduce the number of intensities to at or below the maximum limit.

In an example, determining which one or more intensities to delete includes selecting up to the maximum limit number of intensities having the largest weights in the second set of intensities and including these selected intensities in a final set of intensities. Any remaining intensities are deleted. Up to the maximum limit number of intensities having the largest weights can be selected, for example, by sorting the second set of intensities based on their weights and then selecting the top maximum limit number of intensities in the sorted list. In an example, in the case of identical weights at the maximum limit, all intensities in the tie can be excluded. In another example when identical weights occur at the maximum limit, intensities having velocities that are directed towards the ownship aircraft can be kept over other intensities. Any intensities that are not included (selected) are deleted. This results in a final set of intensities having a number of intensities at or below the maximum limit.

This final set of intensities can then be output from the loop as one or more $T_{k+1}$ track intensities. These $T_{k+1}$ track intensities can be output for display and/or further analysis, such as by a SAA system (block 318). The one or more $T_{k+1}$ track intensities are also provided as input into the next iteration of the loop for updating based on one or more measurements for time step $T_{k+2}$.

EXAMPLE EMBODIMENTS

Example 1 includes a method of tracking multiple objects with a probabilistic hypothesis density filter, the method comprising: providing a plurality of intensities, each intensity including a weight, a state mean vector, and a state covariance matrix of statistics of a track for a plurality of objects at a first time; first pruning the plurality of intensities based on their respective weight to remove lower weighted intensities and produce a first set of intensities; merging intensities in the first set of intensities that are identified as corresponding to the same object to produce a second set of intensities; and second pruning the second set of intensities to produce a final set of intensities, wherein second pruning includes in the final set of intensities, up to a threshold number of intensities having the largest weights in the second set of intensities and excludes from the final set of intensities any remaining intensities in the second set of intensities.

Example 2 includes the method of Example 1, wherein first pruning includes in the first set of intensities, any intensity in the plurality of intensities having a weight above a threshold weight and excludes from the first set of intensities, any intensity in the plurality of intensities having a weight below the threshold weight.

Example 3 includes the method of any of Examples 1-2, wherein first pruning includes in the first set of intensities, any intensity in the plurality of intensities having a weight above a respective threshold weight for that intensity and excludes from the first set of intensities, any intensity having a weight below the respective threshold weight for that intensity.

Example 4 includes the method of Example 3, comprising: selecting each respective threshold weight based on which one or more sensors have measurements that correspond to the intensity corresponding to the respective threshold weight.

Example 5 includes the method of any of Examples 1-4, wherein the plurality of intensities include one or more of a predicted intensity, a measurement-to-track intensity, and a new intensity.

Example 6 includes the method of any of Examples 1-5, wherein first pruning deletes any intensity in the plurality of intensities not included in the first set of intensities.

Example 7 includes the method of any of Examples 1-6, wherein second pruning deletes any intensity in the second set of intensities not included in the final set of intensities.

Example 8 includes a tracking system comprising: one or more processing devices; and one or more data storage devices including instructions which, when executed by the one or more processing devices, cause the one or more processing devices to track multiple objects with a probabilistic hypothesis density filter, wherein the instructions cause the one or more processing devices to: generate a plurality of intensities, each intensity including a weight, a state mean vector, and a state covariance matrix of statistics of a track for a plurality of objects at a first time; first prune the plurality of intensities based on their respective weight to remove lower weighted intensities and produce a first set of intensities; merge intensities in the first set of intensities that are identified as corresponding to the same object to produce a second set of intensities; and second prune the second set of intensities to produce a final set of intensities, wherein second prune includes in the final set of intensities, up to a threshold number of intensities having the largest weights in the second set of intensities and excludes from the final set of intensities, any remaining intensities in the second set of intensities.

Example 9 includes the tracking system of Example 8, wherein first prune includes in the first set of intensities, any intensity in the plurality of intensities having a weight above a threshold weight and excludes from the first set of intensities, any intensity in the plurality of intensities having a weight below the threshold weight.

Example 10 includes the tracking system of any of Examples 8-9, wherein first prune includes in the first set of intensities, any intensity in the plurality of intensities having a weight above a respective threshold weight for that intensity and excludes from the first set of intensities, any intensity having a weight below the respective threshold weight for that intensity.

Example 11 includes the tracking system of Example 10, wherein the instructions cause the one or more processing devices to: select each respective threshold weight based on which one or more sensors have measurements that correspond to the intensity corresponding to the respective threshold weight.

Example 12 includes the tracking system of any of Examples 8-11, wherein the plurality of intensities include one or more of a predicted intensity, a measurement-to-track intensity, and a new intensity.

Example 13 includes the tracking system of any of Examples 8-12, wherein first prune deletes any intensity in the plurality of intensities not included in the first set of intensities.

Example 14 includes the tracking system of any of Examples 8-13, wherein second prune deletes any intensity in the second set of intensities not included in the final set of intensities.

Example 15 includes a computer readable medium including instructions which, when executed by one or more processing devices, cause the one or more processing devices to: generate a plurality of intensities, each intensity including a weight, a state mean vector, and a state covariance matrix of statistics of a track for a plurality of objects at a first time; first prune the plurality of intensities based on their respective weight to remove lower weighted intensities and produce a first set of intensities; merge intensities in the first set of intensities that are identified as corresponding to the same object to produce a second set of intensities; and second prune the second set of intensities to produce a final set of intensities, wherein second prune includes in the final set of intensities, up to a threshold number of intensities having the largest weights in the second set of intensities and excludes from the final set of intensities, any remaining intensities in the second set of intensities.

Example 16 includes the computer readable medium of Example 15, wherein first prune includes in the first set of intensities, any intensity in the plurality of intensities having a weight above a threshold weight and excludes from the first set of intensities, any intensity in the plurality of intensities having a weight below the threshold weight.

Example 17 includes the computer readable medium of any of Examples 15-16, wherein first prune includes in the first set of intensities, any intensity in the plurality of intensities having a weight above a respective threshold weight for that intensity and excludes from the first set of intensities, any intensity having a weight below the respective threshold weight for that intensity.

Example 18 includes the computer readable medium of Example 17, wherein the instructions cause the one or more processing devices to: select each respective threshold weight based on which one or more sensors have measurements that correspond to the intensity corresponding to the respective threshold weight.

Example 19 includes the computer readable medium of any of Examples 15-18, wherein the plurality of intensities include one or more of a predicted intensity, a measurement-to-track intensity, and a new intensity.

Example 20 includes the computer readable medium of any of Examples 15-19, wherein first prune deletes any intensity in the plurality of intensities not included in the first set of intensities, wherein second prune deletes any intensity in the second set of intensities not included in the final set of intensities.

What is claimed is:
1. A tracking method comprising:
tracking multiple objects in an environment around a vehicle with a probabilistic hypothesis density filter, with an aid of one or more sensors onboard the vehicle and one or more processing devices operatively coupled to the one or more sensors, which are configured to perform a method comprising:
detecting a plurality of reflected signals in the one or more sensors from the multiple objects in the environment around the vehicle;
computing a plurality of measurements based on the detected reflected signals in the one or more sensors;
generating a plurality of intensities based on the computed measurements, each intensity being associated to a track of one of the multiple objects and including a weight, a state mean vector, and a state covariance matrix of statistics of the track, at a first time;

first pruning the plurality of intensities based on their respective weight to remove lower weighted intensities than a certain weighted intensity and produce a first set of intensities;

merging intensities in the first set of intensities that are identified as corresponding to a same object to produce a second set of intensities; and second pruning the second set of intensities to produce a final set of intensities, wherein second pruning includes in the final set of intensities, up to a threshold number of intensities having the largest weights in the second set of intensities and excludes from the final set of intensities, any remaining intensities in the second set of intensities;

wherein in the final set of intensities, each intensity corresponds to an object being tracked.

2. The method of claim 1, wherein first pruning includes in the first set of intensities, any intensity in the plurality of intensities having a weight above a respective threshold weight for that intensity and excludes from the first set of intensities, any intensity having a weight below the respective threshold weight for that intensity.

3. The method of claim 2, further comprising:
selecting each respective threshold weight based on which one or more of the sensors have measurements that correspond to the intensity corresponding to the respective threshold weight.

4. The method of claim 1, wherein the plurality of intensities include one or more of a predicted intensity, a measurement-to-track intensity, and a new intensity.

5. The method of claim 1, wherein first pruning deletes any intensity in the plurality of intensities not included in the first set of intensities.

6. The method of claim 1, wherein second pruning deletes any intensity in the second set of intensities not included in the final set of intensities.

7. A tracking system comprising:
one or more processing devices onboard a vehicle;
one or more sensors onboard the vehicle and operatively coupled to the one or more processing devices; and
one or more data storage devices including instructions which, when executed by the one or more processing devices, cause the one or more processing devices to:
track multiple objects in an environment around the vehicle with a probabilistic hypothesis density filter with an aid of the one or more sensors onboard the vehicle;
detect a plurality of reflected signals received in the one or more sensors from the multiple objects in the environment around the vehicle;
compute a plurality of measurements based on the detected reflected signals in the one or more sensors;
generate a plurality of intensities based on the computed measurements, each intensity being associated to a track of one of the multiple objects and including a weight, a state mean vector, and a state covariance matrix of statistics of the track, at a first time;
first prune the plurality of intensities based on their respective weight to remove lower weighted intensities than a certain weighted intensity and produce a first set of intensities;
merge intensities in the first set of intensities that are identified as corresponding to a same object to produce a second set of intensities; and
second prune the second set of intensities to produce a final set of intensities, wherein second prune includes in the final set of intensities, up to a threshold number of intensities having the largest weights in the second set of intensities and excludes from the final set of intensities, any remaining intensities in the second set of intensities;

wherein in the final set of intensities, each intensity corresponds to an object being tracked.

8. The tracking system of claim 7, wherein first prune includes in the first set of intensities, any intensity in the plurality of intensities having a weight above a respective threshold weight for that intensity and excludes from the first set of intensities, any intensity having a weight below the respective threshold weight for that intensity.

9. The tracking system of claim 8, wherein the instructions cause the one or more processing devices to:
select each respective threshold weight based on which one or more of the sensors have measurements that correspond to the intensity corresponding to the respective threshold weight.

10. The tracking system of claim 7, wherein the plurality of intensities include one or more of a predicted intensity, a measurement-to-track intensity, and a new intensity.

11. The tracking system of claim 7, wherein first prune deletes any intensity in the plurality of intensities not included in the first set of intensities.

12. The tracking system of claim 7, wherein second prune deletes any intensity in the second set of intensities not included in the final set of intensities.

13. The tracking system of claim 7, wherein:
the vehicle comprises an aircraft; and
the plurality of sensors comprise one or more of a radar, a traffic collision avoidance system (TCAS) sensor, an automatic dependent surveillance-broadcast (ADS-B) sensor, an optical camera, or a LiDAR.

14. A non-transitory computer readable medium including instructions which, when executed by one or more processing devices, cause the one or more processing devices to:
track multiple objects in an environment around a vehicle with a probabilistic hypothesis density filter with an aid of one or more sensors onboard the vehicle;
detect a plurality of reflected signals received in the one or more sensors from the multiple objects in the environment around the vehicle;
compute a plurality of measurements based on the detected reflected signals in the one or more sensors;
generate a plurality of intensities based on the computed measurements, each intensity being associated to a track of one of the multiple objects and including a weight, a state mean vector, and a state covariance matrix of statistics of the track, at a first time;
first prune the plurality of intensities based on their respective weight to remove lower weighted intensities than a certain weighted intensity and produce a first set of intensities;
merge intensities in the first set of intensities that are identified as corresponding to a same object to produce a second set of intensities; and
second prune the second set of intensities to produce a final set of intensities, wherein second prune includes in the final set of intensities, up to a threshold number of intensities having the largest weights in the second set of intensities and excludes from the final set of intensities, any remaining intensities in the second set of intensities;

wherein in the final set of intensities, each intensity corresponds to an object being tracked.

15. The non-transitory computer readable medium of claim 14, wherein first prune includes in the first set of intensities, any intensity in the plurality of intensities having a weight above a respective threshold weight for that intensity and excludes from the first set of intensities, any intensity having a weight below the respective threshold weight for that intensity.

16. The non-transitory computer readable medium of claim 15, wherein the instructions cause the one or more processing devices to:
   select each respective threshold weight based on which one or more of the sensors have measurements that correspond to the intensity corresponding to the respective threshold weight.

17. The non-transitory computer readable medium of claim 14, wherein the plurality of intensities include one or more of a predicted intensity, a measurement-to-track intensity, and a new intensity.

18. The non-transitory computer readable medium of claim 14, wherein first prune deletes any intensity in the plurality of intensities not included in the first set of intensities, wherein second prune deletes any intensity in the second set of intensities not included in the final set of intensities.

* * * * *